(12) United States Patent
Balde et al.

(10) Patent No.: US 12,280,694 B2
(45) Date of Patent: Apr. 22, 2025

(54) MAT FOR DETECTING THE OCCUPANCY OF A MOTOR VEHICLE SEAT, SYSTEM FOR DETERMINING CAPACITANCE, METHOD FOR DETERMINING A CAPACITANCE OR A STATE OF OCCUPANCY OF A SEAT, METHOD FOR DETECTING A ROTATION OF A PART OF THE TRUNK OF AN OCCUPANT SEATED ON A SEAT

(71) Applicant: FAURECIA Sièges d'Automobile, Nanterre (FR)

(72) Inventors: Mamadou Balde, Morigny-Champigny (FR); Abdou Latif Djiram, Chilly-Maz (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 0 days.

(21) Appl. No.: 18/379,381

(22) Filed: Oct. 12, 2023

(65) Prior Publication Data
US 2024/0123870 A1  Apr. 18, 2024

(30) Foreign Application Priority Data

Oct. 12, 2022  (FR) ...................................... 2210450

(51) Int. Cl.
*B60N 2/00* (2006.01)
*B60N 2/90* (2018.01)
*B60R 16/02* (2006.01)

(52) U.S. Cl.
CPC ......... *B60N 2/0033* (2023.08); *B60N 2/0027* (2023.08); *B60N 2210/12* (2023.08)

(58) Field of Classification Search
CPC .... B60N 2/002; B60N 2/0021; B60N 2/0024; B60N 2/0027; B60N 2/003; B60N 2/0033;
(Continued)

(56) References Cited

U.S. PATENT DOCUMENTS 10,493,951 B2 * 12/2019 Ortiz ....................... B60R 22/12
2010/0101858 A1 * 4/2010 Kato ...................... H05K 1/038
174/84 R
(Continued)

FOREIGN PATENT DOCUMENTS

DE      10228419 B3 *  3/2004  ............. B60N 2/002
DE  102013110017 A1 *  3/2015  ............. B60N 2/002
(Continued)

OTHER PUBLICATIONS

French Search Report for Priority French Patent App. No. FR2210450 dated May 30, 2023, 16 pages.

*Primary Examiner* — Jason D Shanske
*Assistant Examiner* — Daniel M. Keck
(74) *Attorney, Agent, or Firm* — Barnes & Thornburg LLP

(57) ABSTRACT

The present disclosure relates to a mat for detecting the occupancy of a motor vehicle seat, comprising a flexible support, an interdigitated capacitive sensor borne by the flexible support, a first conductive track borne by the flexible support, the first conductive track having a first end connected to the interdigitated capacitive sensor and a second end intended to be connected to a computing unit, a second conductive track borne by the support, the second conductive track having a first free end and a second end intended to be connected to the computing unit. The present disclosure also relates to a system for determining a capacitance, a method for determining a capacitance or a state of occu- (Continued)

pancy of a seat and a method for detecting a rotation of a part of the trunk of an occupant seated on a seat.

12 Claims, 5 Drawing Sheets

(58) Field of Classification Search
CPC .... B60N 2/0035; B60N 2/90; B60N 2210/12; B60N 2230/10; B60R 16/02
USPC ........................................ 180/271, 272, 273
See application file for complete search history.

(56) References Cited

U.S. PATENT DOCUMENTS

| | | |
|---|---|---|
| 2013/0127212 A1 | 5/2013 | Aoki |
| 2014/0246887 A1* | 9/2014 | Clos .................... B60N 2/0031 297/217.3 |
| 2016/0317047 A1* | 11/2016 | Sugiyama ................ A61B 5/30 |
| 2018/0238731 A1* | 8/2018 | Butts .................... B60N 2/0035 |
| 2021/0016683 A1 | 1/2021 | Balde |
| 2021/0213853 A1 | 7/2021 | Balde |
| 2024/0217433 A1* | 7/2024 | Baudu ..................... B60Q 9/00 |

FOREIGN PATENT DOCUMENTS

| | | | | |
|---|---|---|---|---|
| DE | 102015117564 A1 * | 4/2016 | ............ | B60R 16/02 |
| EP | 3814196 | 5/2021 | | |
| FR | 2110331 | 6/1972 | | |
| FR | 3098769 A1 | 1/2021 | | |
| FR | 3148296 A1 * | 11/2024 | ........... | B60N 2/0021 |
| RU | 149361 U1 * | 12/2014 | ............ | B60N 2/002 |

* cited by examiner

MAT FOR DETECTING THE OCCUPANCY OF A MOTOR VEHICLE SEAT, SYSTEM FOR DETERMINING CAPACITANCE, METHOD FOR DETERMINING A CAPACITANCE OR A STATE OF OCCUPANCY OF A SEAT, METHOD FOR DETECTING A ROTATION OF A PART OF THE TRUNK OF AN OCCUPANT SEATED ON A SEAT

PRIORITY CLAIM

This application claims priority to French Patent Application No. FR2210450, filed Oct. 12, 2022, which is expressly incorporated by reference herein.

BACKGROUND

The present disclosure relates to the field of mats for detecting a state of occupancy of a motor vehicle seat.

SUMMARY

According to the present disclosure, a mat is configured to detect the state of occupancy of a vehicle seat, in particular of a motor vehicle. The detection mat comprises, for example, at least one flexible support, at least one interdigitated capacitive sensor borne by the flexible support, at least a first conductive track borne by the flexible support, the first conductive track having a first end connected to the interdigitated capacitive sensor and a second end intended to be connected to a computing unit, and at least one second conductive track borne by the support, the second conductive track having a first free end and a second end intended to be connected to the computing unit.

In illustrative embodiments, the second conductive track extends over a length of between 20 and 150 millimeters and preferably between 50 and 110 millimeters.

In illustrative embodiments, a system for determining a capacitance of an interdigitated capacitive sensor intended to be arranged on a seat of a vehicle, in particular of a motor vehicle, the system may comprise, for example, at least one flexible support, at least one interdigitated capacitive sensor borne by the flexible support, at least a first conductive track borne by the flexible support, the first conductive track having a first end connected to the interdigitated capacitive sensor and a second end; a connection housing; at least one first electrical cable connected to the second end of the first conductive track, via the connection housing; at least one second electrical cable connected to a first connection element of the connection housing, a computing unit connected at least one first electrical cable and at least one second electrical cable, the computing unit being configured to determine a first capacitance at one end of the at least one first electrical cable and a second capacitance at one end of the at least one second electrical cable, the computing unit being configured to subtract the second capacitance from the first capacitance to determine the capacitance of the interdigitated capacitive sensor.

In illustrative embodiments, the connection housing comprises a second connection element, the determining system further comprising at least one second conductive track borne by the flexible support, the at least one second conductive track having a first free end and a second end connected to the second connection element of the connection housing.

In illustrative embodiments, a seat of a motor vehicle may comprise a seat bottom, a backrest articulated to the seat bottom and a determining system according to the features mentioned above, the flexible support being attached to the backrest or the seat bottom.

The features disclosed in the following paragraphs may optionally be implemented. They can be implemented independently of one another or in combination with one another:

the connection housing comprises a second connection element, the determining system further comprising at least one second conductive track borne by the flexible support, the second conductive track having a first free end and a second end connected to the second connection element of the connection housing, and wherein the first free end is arranged in a zone of the seat which is not in contact with an occupant, when an occupant is seated on the seat;

the first free end is arranged in a zone located behind the seat bottom, the zone being adjacent to the backrest;

the seat bottom comprises a groove adjacent to the backrest and wherein the first free end is arranged in the groove.

In illustrative embodiments, a method for determining a capacitance of an interdigitated capacitive sensor arranged on a seat of a vehicle, in particular of a motor vehicle, by a computing unit; the seat comprising at least one interdigitated capacitive sensor; the vehicle comprising a computing unit, first conductive elements having a first end connected to the interdigitated capacitive sensor and a second end connected to the computing unit, second conductive elements having a first free end and a second end connected to the computing unit, the method comprising the following steps:

determining a capacitance, called first capacitance, at the second end of the first conductive elements, determining a capacitance, called second capacitance, at the second end of the second conductive elements, subtracting the determined second capacitance from the determined first capacitance to determine the capacitance of the interdigitated capacitive sensor arranged on the seat.

In illustrative embodiments, a method for determining the state of occupancy of a seat of a motor vehicle, the method comprising the steps of the method for determining the capacitance of an interdigitated capacitive sensor mentioned above and a step of determining the state of occupancy of a seat from the determined capacitance.

In illustrative embodiments, a method for detecting a rotation of a part of the trunk of an occupant seated on a seat, the method comprising the steps of the method for determining the capacitance of an interdigitated capacitive sensor mentioned above and a step of determining the state of occupancy of a seat from the determined capacitance.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

In the present patent application, the terms "front" and "rear" are to be interpreted by considering the direction of forward motion of a motor vehicle.

Figure 1:
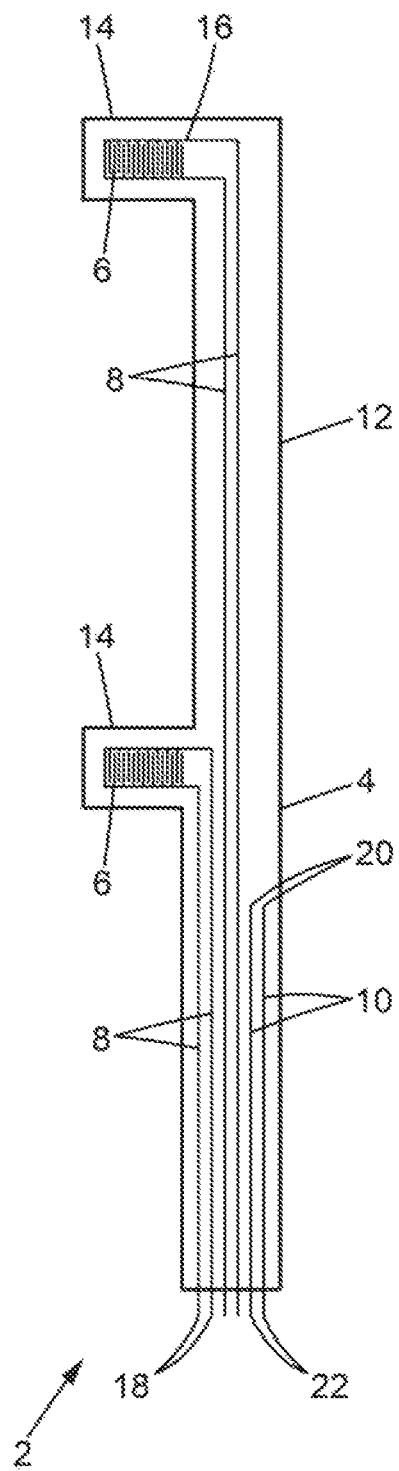
FIG. 1 is a schematic view of a detection mat according to a first embodiment of the present disclosure.

Referring to FIG. 1, the detection mat 2 according to a first embodiment of the present disclosure comprises a flexible support 4, two interdigitated capacitive sensors 6 borne by the flexible support and first 8 and second 10 conductive tracks borne by the flexible support.

The flexible support 4 is made of an impermeable and elastic material. The flexible support 4 may for example be made of a material from among thermoplastic polyurethane, polydimethylsiloxane (referred to by the acronym PDMS), polyvinyl alcohol (referred to by the acronym PVA), silicone, polyethylene (referred to by the acronym PE), poly (ethylene 2,6-naphthalenedicarboxylate) (referred to by the acronym PEN) and polyimide (referred to by the acronym PI).

In the embodiment shown and which is in no way limiting, the flexible support 4 comprises a main strip 12 and two strip portions 14 extending transversely to the main strip.

The interdigitated capacitive sensors 6 each comprise two coplanar comb-shaped electrodes that penetrate one another. Each electrode is connected to a first conductive track 8. One electrode is intended to be connected to a potential of between 5 Volts and 12 Volts. The other electrode is connected to a ground. The electrodes are not shown in detail in the figures. The interdigitated capacitive sensors are also called capacitive sensors with interdigitated electrodes.

The interdigitated capacitive sensors 6 are attached to the transverse strip portions 14 of the flexible support, preferably by electronic printing.

The first conductive tracks 8 are attached to the main strip 12 of the flexible support, preferably by electronic printing. They extend in a longitudinal direction of the main strip. The first conductive tracks 8 each comprise a first end 16 connected to an electrode of an interdigitated capacitive sensor and a second end 18 attached to the tip of the main strip 12.

The second conductive tracks 10 are attached to the main strip of the flexible support, preferably by electronic printing. They are parallel to the first conductive tracks 8. They are adjacent to the first conductive tracks 8. More particularly, they are located at a distance of between 20 and 150 millimeters relative to the closest first conductive track 8.

The second conductive tracks 10 each comprise a first free end 20 and a second end 22 located at the tip of the main strip 12. The first end 20 of the conductive tracks is free, that is, it is not connected to any electronic component.

The second ends 18, 22 of the first and second conductive tracks are intended to be connected to a computing unit, as explained below.

The second conductive track 10 extends over a length of between 20 and 150 millimeters, and preferably between 50 and 110 millimeters.

As a variant, the detection mat comprises a single interdigitated capacitive sensor 6 and a single side strip portion 14.

As a variant, the detection mat comprises a number of interdigitated capacitive sensors greater than two and a number of corresponding side strip portions 14.

The operation of the detection mat 2 will be described in connection with FIGS. 3 and 6.

Figure 2:
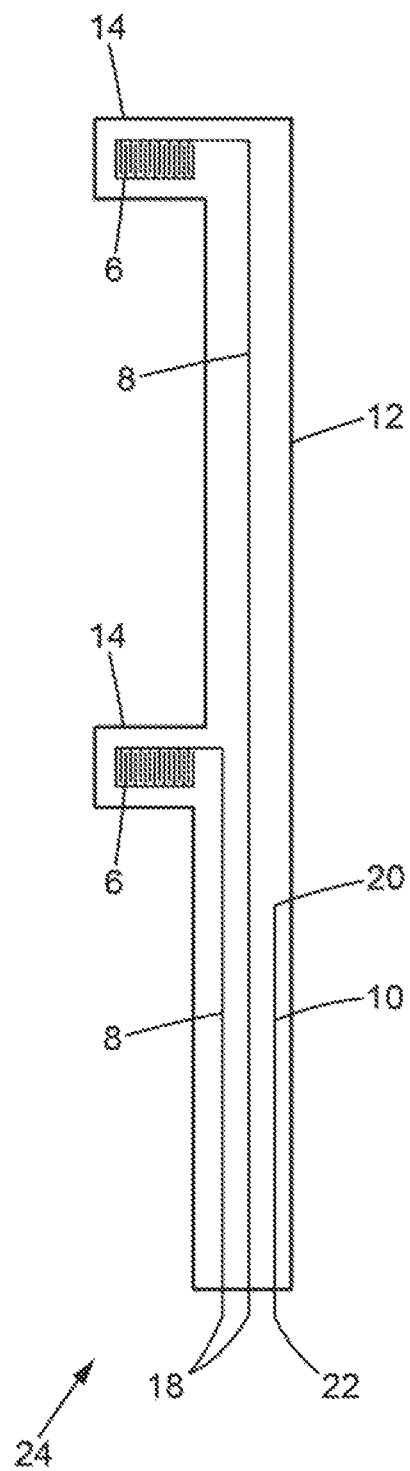
FIG. 2 is a schematic view of a detection mat according to a second embodiment of the present disclosure.

Referring to FIG. 2, the detection mat 24 according to a second embodiment of the present disclosure is identical to the detection mat according to the first embodiment with the exception that a single first conductive track 8 is connected to each interdigitated capacitive sensor 6 and the fact that the detection mat comprises a single second conductive track 10.

Figure 3:
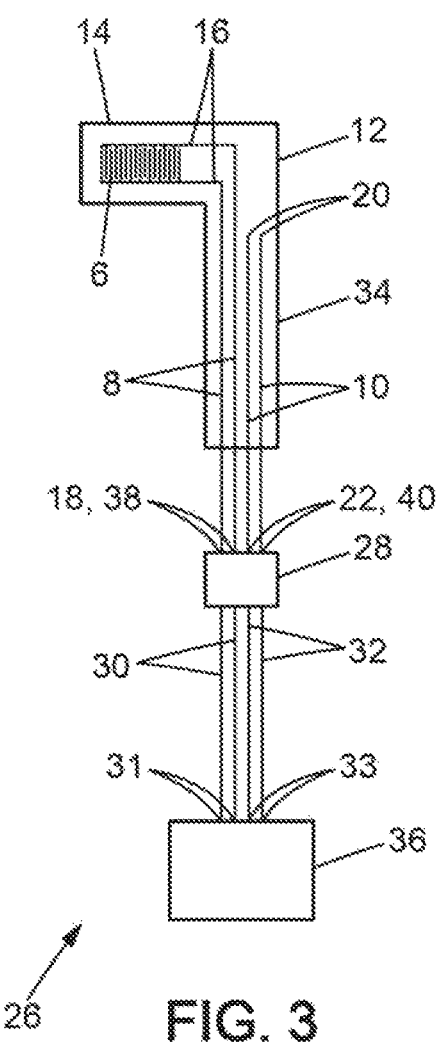
FIG. 3 is a schematic view of a system for determining the state of occupancy of a seat according to a first embodiment of the present disclosure.

Referring to FIG. 3, the system 26 for determining the occupancy status of a motor vehicle seat according to a first embodiment of the present disclosure comprises a flexible support 34, an interdigitated capacitive sensor 6 borne by the flexible support 34, two first 8 and two second 10 conductive tracks borne by the flexible support.

The flexible support 34, the interdigitated capacitive sensor 6, the first 8 and second 10 conductive tracks are similar to the flexible support 4, the interdigitated capacitive sensors, the first 8 and second 10 conductive tracks of the detection mat 2 according to the first embodiment and will not be described again.

The determining system 26 further comprises a connection housing 28, first 30 and second 32 electrical cables and a computing unit 36.

The connection housing 28 comprises first 38 and second 40 connection elements, such as conductive bushings. The first connection elements 38 are connected to the second ends 18 of the first conductive tracks 8 and to the first electrical cables 30. The second connection elements 40 are connected to the second ends 22 of the second conductive tracks 10 and to the second electrical cables 32.

The first 30 and second 32 electrical cables are electrically connected to the computing unit 36. The first 30 and second 32 electrical cables are part of a bundle of electrical cables, generally called cable harness.

The computing unit 36 comprises a central processing unit, such as a processor or a microprocessor. The computing unit also comprises a random access memory, denoted RAM, and/or a read-only memory, and executable code making it possible to implement the determining method described below.

The computing unit 36 may be a programmable apparatus that uses software, an integrated circuit (ASIC), or a part of the engine control unit (ECU).

The computing unit 36 is configured to measure a first capacitance Cmes between the ends 31 of the first electrical cables 30. The first capacitance Cmes is representative of the capacitance of the interdigitated capacitive sensor 6 and of the electrical charges present in the first conductive tracks 8, in the connection housing 28 and in the first electrical cables 30.

These charges can be induced in these conductive elements by the environment and by the computing unit 36.

The computing unit 36 is configured to determine and a second capacitance Cref between the ends 33 of the second electrical cables 30.

The second capacitance Cref is representative of the electrical charges present in the second conductive tracks 10, in the connection housing 28 and in the second electrical cables 30.

The computing unit is further configured to calculate the difference Ccapa between the first capacitance Cmes and the second capacitance Cref and to determine the state of occupancy of a seat based on the difference calculated or to detect a rotation of a part of the trunk of an occupant seated on a seat The charges present in the conductive elements located between the free end 20 of the second conductive track 10 and the computing unit 6 are similar to the charges present in the first conductive tracks 8, the connection housing 28 and the first electrical cables 30 because they are arranged in the same environment, they undergo the same impacts and they are exposed to the same temperatures and humidity.

Advantageously, the difference Ccapa is more representative of the electrical charges actually present in the interdigitated capacitive sensor 6 because the charges present in the conductive elements located between the free end 20 of the second conductive track 10 and the computing unit 6 have been removed.

The charges present in the conductive elements located between the interdigitated capacitive sensor 6 and the computing unit 6 generate a noise that generates an error in the measurement of the capacitances of the interdigitated capacitive sensors.

This noise varies based on the environment of the determining system such as, for example, foams used for the seat, but also based on temperature, humidity in the air, aging of the electrical components and aging of the fabrics, foam, plastic surrounding the determining system and depending on the impacts experienced by the electrical cables.

Advantageously, the second capacitance Cref is representative of this noise. The second capacitance varies over time in the same way as the noise. Subtracting the second capacitance Cref from the first capacitance makes it possible to obtain a more accurate measurement of the capacitances actually present in the interdigitated capacitive sensors. This measurement precision considerably improves the performance of programs for determining the presence of an occupant and programs for determining the occupant's position. Additionally, this improvement is even more obvious when the detection mat or the determining system and the seat have already existed for several years.

Advantageously, this present disclosure makes it possible to increase the viable operating time of the detection mats, methods for determining the presence of an occupant and programs for determining the position of an occupant in order to make them more compliant with user expectations.

According to a variant not shown, the determining system 26 comprises:
- a single first conductive track 8 connected to the interdigitated capacitive sensor 6,
- a single first electrical cable 30 connected to the computing unit 36 and to the first conductive track by the connection housing,
- a single second conductive track 10, and
- a single second electrical cable 32 connected to the computing unit 36 and to the second conductive track by the connection housing.

According to this variant, the computing unit measures the potential difference between the ground of the vehicle and the end 31 of the first electrical cable 30 to determine the first capacitance Cmes, and the potential difference between the ground of the vehicle and the end 33 of the second electrical cable 32 to determine the second capacitance Cref.

Figure 4:
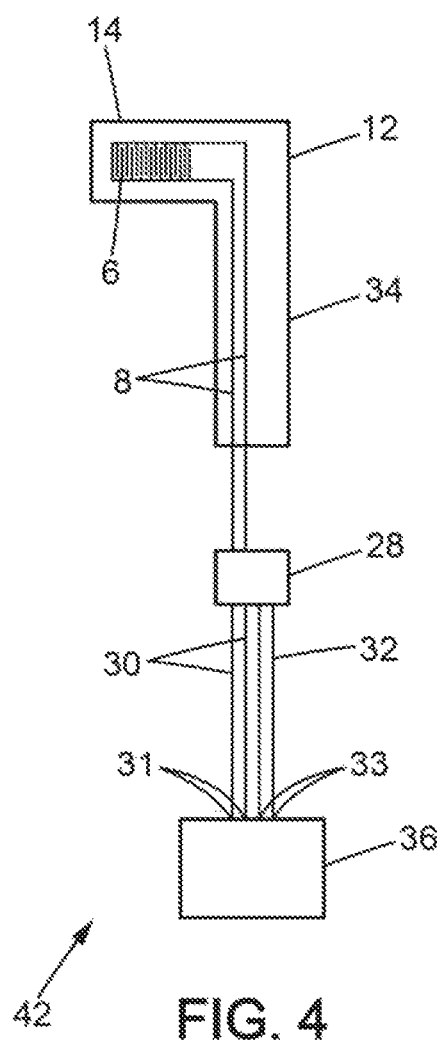
FIG. 4 is a schematic view of a system for determining the state of occupancy of a seat according to a second embodiment of the present disclosure.

Referring to FIG. 4, the system 42 for determining the state of occupancy of a motor vehicle seat according to a second embodiment of the present disclosure is similar to the determining system 26 according to the first embodiment with the exception that it does not comprise second conductive tracks 10. This determining system will not be described again.

The second capacitance Cref measured by the computing unit here is representative of the electrical charges present in the connection housing 28 and in the second electrical cables 32.

This second embodiment is less expensive to produce, but the measurement of the capacitance of the interdigitated capacitive sensors is less precise than with the determining system according to the first embodiment.

Figure 5:
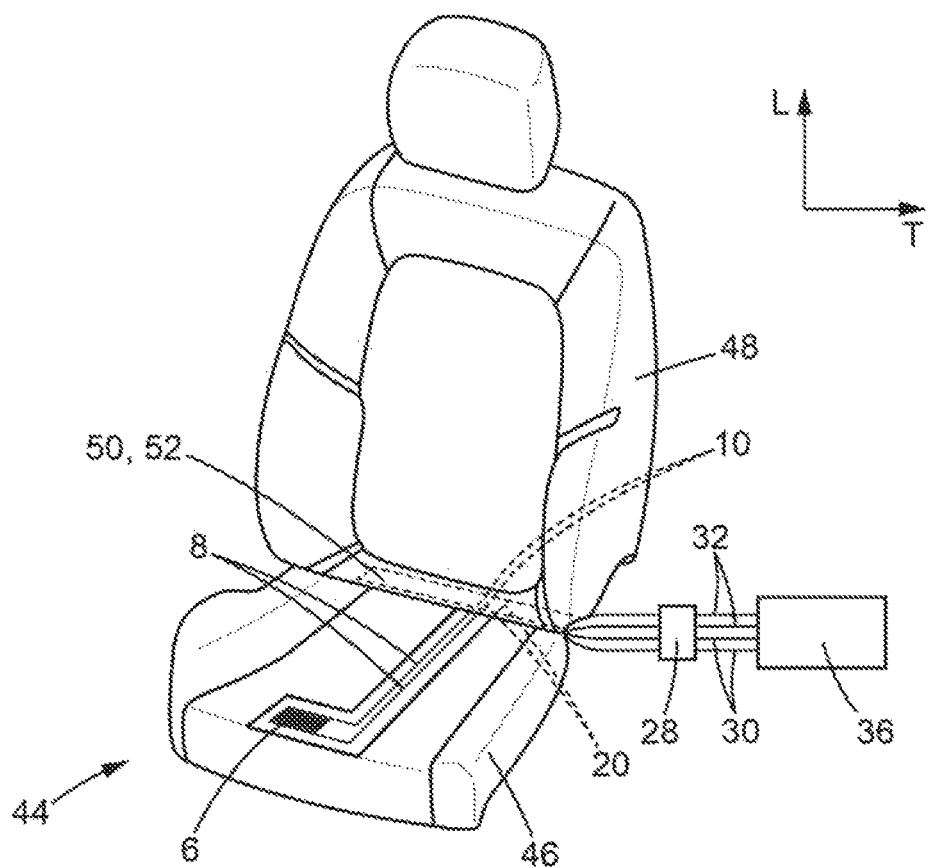
FIG. 5 is a schematic view of a seat according to the present disclosure.

With reference to FIG. 5, the seat 44 according to the present disclosure comprises a seat bottom 46, a backrest 48 articulated to the seat bottom and a determining system according to the system shown in FIG. 3.

The first end 20 of the second conductive tracks is advantageously attached in a zone 50 of the seat that is not a contact zone with an occupant, when an occupant is seated on the seat.

In particular, the zone 50 is located on the rear part of the seat bottom near the backrest. It is covered with at least part of the backrest 48 so that it is not in contact with an occupant when the occupant is seated on the seat.

In particular, the zone 50 is made up of the edge of the seat bottom and is called seat bottom inset.

The zone 50 may be a strip of the seat bottom that extends in a transverse direction T.

According to one embodiment, the seat bottom comprises a groove 52 extending in a transverse direction T. The groove 52 is located on the rear part of the seat bottom in the vicinity of the backrest. It is covered with at least part of the backrest 48. The first end 20 of the second conductive tracks is attached in the groove 52.

According to less advantageous variants, the first end 20 of the second conductive tracks is attached to a side part of the armrest or to a rear face of the backrest.

Alternatively, the seat according to the present disclosure comprises a determining system 42 as shown in FIG. 4.

Figure 6:
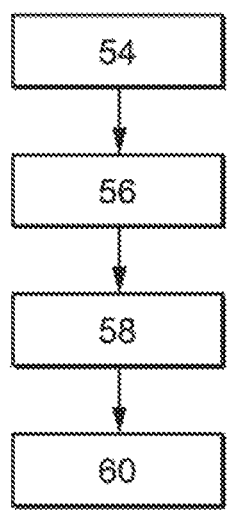
FIG. 6 is a flowchart of the steps of the detection method according to the present disclosure.

Referring to FIG. 6, the present disclosure also relates to a method for determining a capacitance of an interdigitated capacitive sensor 6 arranged on a seat 44 of a vehicle, in particular of a motor vehicle. The method is implemented using the determining system shown in FIG. 3 or 4.

The method begins with a step 54 of determining a capacitance, called first capacitance Cmes, at the second end 33 of first conductive elements. The first conductive elements comprise at least a first conductive track 8, a connection housing 28 and at least one first electrical cable 30.

Then, the method comprises a step 56 of determining a capacitance, called second capacitance Cref, at the second end 33 of second conductive elements. The second conductive elements comprise a connection housing 28 and at least one second electrical cable 32 if the determining system shown in FIG. 4 is used. The second conductive elements comprise at least one second conductive track 10, a connection housing 28 and at least one second electrical cable 32 if the determining system shown in FIG. 3 is used.

The method continues with a step 58 during which the second capacitance Cref is subtracted from the determined first capacitance Cmes to determine the capacitance of the interdigitated capacitive sensor 6 arranged on the seat.

The present disclosure also relates to a method for determining the state of occupancy of a seat of a motor vehicle. This method comprises steps 54 to 58 of the method for determining the capacitance of an interdigitated capacitive sensor and a step 60 of determining the state of occupancy of a seat from the capacitance determined at the end of step 58.

The method is implemented by the computing unit 26.

As a variant, the capacitance of an interdigitated capacitive sensor calculated in step 58 is used in a method for detecting a rotation of a part of the trunk of an occupant seated on a seat.

The present disclosure relates to a mat for detecting the occupancy of a motor vehicle seat, comprising a flexible support (4), an interdigitated capacitive sensor (6) borne by the flexible support, a first conductive track (8) borne by the flexible support, the first conductive track (8) having a first end (16) connected to the interdigitated capacitive sensor (6) and a second end (18) intended to be connected to a computing unit, a second conductive track (10) borne by the support, the second conductive track having a first free end (20) and a second end (22) intended to be connected to the computing unit.

The present disclosure also relates to a system for determining a capacitance, a method for determining a capacitance or a state of occupancy of a seat and a method for detecting a rotation of a part of the trunk of an occupant seated on a seat The capacitance values measured at the terminals of the interdigitated capacitive sensors of an occupancy detection mat may be affected by an error that varies on the one hand based on each sensor, each seat and each vehicle, and on the other hand based on time.

This error may cause difficulties in detecting the presence of a person or difficulties in determining the type of person. These difficulties increase over the life of the product.

One comparative approach to overcoming this drawback is to carry out measurements of capacitances of each interdigitated capacitive sensor of each detection mat when the seat is mounted in the vehicle and then to record a correction value for each interdigitated capacitive sensor in a memory of a controller. These measurements can be carried out at the factory or the dealer when the seat is attached in the vehicle.

However, this comparative adjustment requires time and labor. It must be carried out again once the detection mat or the seat is replaced and when the controller is reset.

The present disclosure aims to overcome the drawbacks mentioned above.

The first object of the present disclosure is a mat for detecting the state of occupancy of a vehicle seat, in particular of a motor vehicle, the detection mat comprising:
- at least one flexible support,
- at least one interdigitated capacitive sensor borne by the flexible support,
- at least a first conductive track borne by the flexible support, the first conductive track having a first end connected to the interdigitated capacitive sensor and a second end intended to be connected to a computing unit,
- at least one second conductive track borne by the support, the second conductive track having a first free end and a second end intended to be connected to the computing unit.

According to one embodiment, the second conductive track extends over a length of between 20 and 150 millimeters and preferably between 50 and 110 millimeters.

The second object of the present disclosure is a system for determining a capacitance of an interdigitated capacitive sensor intended to be arranged on a seat of a vehicle, in particular of a motor vehicle, the system comprising:
- at least one flexible support,
- at least one interdigitated capacitive sensor borne by the flexible support,
- at least a first conductive track borne by the flexible support, the first conductive track having a first end connected to the interdigitated capacitive sensor and a second end;
- a connection housing;
- at least one first electrical cable connected to the second end of the first conductive track, via the connection housing;
- at least one second electrical cable connected to a first connection element of the connection housing,
- a computing unit connected at least one first electrical cable and at least one second electrical cable, the computing unit being configured to determine a first capacitance at one end of the at least one first electrical cable and a second capacitance at one end of the at least one second electrical cable, the computing unit being configured to subtract the second capacitance from the first capacitance to determine the capacitance of the interdigitated capacitive sensor.

According to one embodiment, the connection housing comprises a second connection element, the determining system further comprising at least one second conductive track borne by the flexible support, the at least one second conductive track having a first free end and a second end connected to the second connection element of the connection housing.

The third object of the present disclosure is a seat of a motor vehicle comprising a seat bottom, a backrest articulated to the seat bottom and a determining system according to the features mentioned above, the flexible support being attached to the backrest or the seat bottom.

The features disclosed in the following paragraphs may optionally be implemented. They can be implemented independently of one another or in combination with one another:
- the connection housing comprises a second connection element, the determining system further comprising at least one second conductive track borne by the flexible support, the second conductive track having a first free end and a second end connected to the second connection element of the connection housing, and wherein the first free end is arranged in a zone of the seat which is not in contact with an occupant, when an occupant is seated on the seat;
- the first free end is arranged in a zone located behind the seat bottom, the zone being adjacent to the backrest;
- the seat bottom comprises a groove adjacent to the backrest and wherein the first free end is arranged in the groove.

The fourth object of the present disclosure is a method for determining a capacitance of an interdigitated capacitive sensor arranged on a seat of a vehicle, in particular of a motor vehicle, by a computing unit; the seat comprising at least one interdigitated capacitive sensor; the vehicle comprising a computing unit, first conductive elements having a first end connected to the interdigitated capacitive sensor and a second end connected to the computing unit, second conductive elements having a first free end and a second end connected to the computing unit, the method comprising the following steps:

determining a capacitance, called first capacitance, at the second end of the first conductive elements, determining a capacitance, called second capacitance, at the second end of the second conductive elements, subtracting the determined second capacitance from the determined first capacitance to determine the capacitance of the interdigitated capacitive sensor arranged on the seat.

The fifth object of the present disclosure is a method for determining the state of occupancy of a seat of a motor vehicle, the method comprising the steps of the method for determining the capacitance of an interdigitated capacitive sensor mentioned above and a step of determining the state of occupancy of a seat from the determined capacitance.

The sixth object of the present disclosure is a method for detecting a rotation of a part of the trunk of an occupant seated on a seat, the method comprising the steps of the method for determining the capacitance of an interdigitated capacitive sensor mentioned above and a step of determining the state of occupancy of a seat from the determined capacitance.

The invention claimed is:

1. A detection mat for detecting the state of occupancy of a seat of a motor vehicle, the detection mat comprising:
    at least one flexible support,
    at least one interdigitated capacitive sensor borne by the at least one flexible support,
    at least one first conductive track borne by the at least one flexible support, the at least one first conductive track having a first end connected to the at least one interdigitated capacitive sensor and a second end intended to be connected to a computing unit, and
    at least one second conductive track borne by the at least one flexible support, the at least one second conductive track having a first free end and a second end intended to be connected to the computing unit.

2. The detection mat of claim 1, wherein the at least one second conductive track extends over a length of between 20 and 150 millimeters.

3. The detection mat of claim 1, wherein the at least one second conductive track extends over a length of between 50 and 110 millimeters.

4. A system for determining a capacitance of an interdigitated capacitive sensor intended to be arranged on a seat of a motor vehicle, the system comprising:
    at least one flexible support,
    at least one interdigitated capacitive sensor borne by the at least one flexible support,
    at least one first conductive track borne by the at least one flexible support, the at least one first conductive track having a first end connected to the interdigitated capacitive sensor and a second end;
    a connection housing;
    at least one first electrical cable connected to the second end of the at least one first conductive track, via the connection housing;
    at least one second electrical cable connected to a first connection element of the connection housing,
    a computing unit connected to the at least one first electrical cable and the at least one second electrical cable, the computing unit being configured to determine a first capacitance at one end of the at least one first electrical cable and a second capacitance at one end of the at least one second electrical cable, the computing unit being configured to subtract the second capacitance from the first capacitance to determine the capacitance of the at least one interdigitated capacitive sensor.

5. The system of claim 4, wherein the connection housing comprises a second connection element, the determining system further comprising at least one second conductive track borne by the at least one flexible support, the at least one second conductive track having a first free end and a second end connected to the second connection element of the connection housing.

6. A seat of a motor vehicle comprising a seat bottom, a backrest articulated to the seat bottom and the system according to claim 4, the at least one flexible support being attached to the backrest or the seat bottom.

7. The seat of claim 6, wherein the connection housing comprises a second connection element, the system further comprising at least one second conductive track borne by the at least one flexible support, the at least one second conductive track having a first free end and a second end connected to the second connection element of the connection housing, and wherein the first free end is arranged in a zone of the seat which is not in contact with an occupant, when an occupant is seated on the seat.

8. The seat of claim 7, wherein the first free end is arranged in a zone located behind the seat bottom, the zone being adjacent to the backrest.

9. The seat of claim 7, wherein the seat bottom comprises a groove adjacent to the backrest and wherein the first free end is arranged in the groove.

10. A method for determining a capacitance of an interdigitated capacitive sensor arranged on a seat of a motor vehicle, by a computing unit; the seat comprising at least one interdigitated capacitive sensor; the vehicle comprising the computing unit, first conductive elements having a first end connected to the at least one interdigitated capacitive sensor and a second end connected to the computing unit, second conductive elements having a first free end and a second end connected to the computing unit, the method comprising the following steps:
    determining a first capacitance at the second end of the first conductive elements, said first capacitance being representative of the capacitance of the at least one interdigitated capacitive sensor,
    determining a second capacitance at the second end of the second conductive elements,
    subtracting the determined second capacitance from the determined first capacitance to determine the capacitance of the at least one interdigitated capacitive sensor arranged on the seat.

11. A method for determining the state of occupancy of the seat of the motor vehicle, the method comprising the steps of the method for determining the capacitance of an interdigitated capacitive sensor according to claim 10 and a step of determining the state of occupancy of a seat from the determined capacitance.

12. A method for detecting a rotation of a part of the trunk of an occupant seated on a seat of a motor vehicle, the method comprising the steps of the method for determining the capacitance of an interdigitated capacitive sensor according to claim 10 and a step of determining the state of occupancy of the seat from the determined capacitance.

* * * * *